(12) United States Patent
Jackson et al.

(10) Patent No.: US 11,898,998 B2
(45) Date of Patent: Feb. 13, 2024

(54) CONTROLLABLE SAMPLE INTRODUCTION

(71) Applicant: Waters Technologies Corporation, Milford, MA (US)

(72) Inventors: Michael R. Jackson, Woonsocket, RI (US); Joshua A. Burnett, Taunton, MA (US)

(73) Assignee: Waters Technologies Corporation, Milford, MA (US)

( * ) Notice: Subject to any disclaimer, the term of this patent is extended or adjusted under 35 U.S.C. 154(b) by 113 days.

(21) Appl. No.: 17/186,623

(22) Filed: Feb. 26, 2021

(65) Prior Publication Data

US 2021/0270785 A1 Sep. 2, 2021

Related U.S. Application Data

(60) Provisional application No. 62/982,836, filed on Feb. 28, 2020.

(51) Int. Cl.
*G01N 30/32* (2006.01)
*G01N 30/20* (2006.01)
*G01N 30/02* (2006.01)

(52) U.S. Cl.
CPC ............ *G01N 30/32* (2013.01); *G01N 30/20* (2013.01); *G01N 2030/027* (2013.01); *G01N 2030/324* (2013.01)

(58) Field of Classification Search
CPC ............ G01N 30/06; G01N 2030/027; G01N 2030/201; G01N 2030/202; G01N 30/20; G01N 30/24; G01N 2030/326; G01N 30/02; G01N 30/16; G01N 30/32; G01N 30/34; F04B 13/00; F04B 17/03; F04B 2203/0202; F04B 2205/03; F04B 2205/05; F04B 23/06; F04B 49/06; F04B 49/065; F04B 49/08
See application file for complete search history.

(56) References Cited

U.S. PATENT DOCUMENTS

| | | | |
|---|---|---|---|
| 3,236,092 A * | 2/1966 | Carter | G01N 30/16 73/23.35 |
| 4,036,063 A | 7/1977 | Roof et al. | |
| 5,449,902 A * | 9/1995 | Onishi | H01J 49/0431 250/281 |
| 6,396,630 B1 * | 5/2002 | Stiens | G02B 5/3083 359/489.05 |
| 9,816,971 B2 * | 11/2017 | Jackson | G01N 30/20 |
| 2013/0104631 A1 * | 5/2013 | Tokuo | F04B 49/08 73/61.56 |

(Continued)

OTHER PUBLICATIONS

International Search Report and Written Opinion in PCT/US2021/019866 dated Jun. 1, 2021.

(Continued)

*Primary Examiner* — Harshad R Patel
*Assistant Examiner* — Gedeon M Kidanu
(74) *Attorney, Agent, or Firm* — Schmeiser, Olsen & Watts LLP; Victor J. Baranowski

(57) ABSTRACT

A method for injecting a sample into a flow of a liquid chromatography system includes providing a flow of a mobile phase, and injecting a volume of a sample into the flow of the mobile phase such that the concentration of the sample within the mobile phase varies with a triangular profile over the course of the injecting.

20 Claims, 6 Drawing Sheets

(56) References Cited

U.S. PATENT DOCUMENTS

| | | | |
|---|---|---|---|
| 2016/0069844 A1* | 3/2016 | Jackson | G01N 30/06 |
| | | | 73/61.55 |
| 2018/0149629 A1* | 5/2018 | Dasgupta | G01N 30/30 |
| 2018/0364203 A1 | 12/2018 | Burnett et al. | |

OTHER PUBLICATIONS

Reilley, Charles N., et al., "Gas Chromatographic Response as a Function of Sample Input Profile," Analytical Chemistry, vol. 34, No. 10, Sep. 1, 1962, pp. 1198-1213.
International Preliminary Report on Patentability in PCT/US2021/019866 dated Sep. 9, 2022.

\* cited by examiner

CONTROLLABLE SAMPLE INTRODUCTION

RELATED APPLICATION

This application claims the benefit of the earlier filing date of U.S. Provisional Patent Application Ser. No. 62/982,836 filed Feb. 28, 2020 and titled "Controllable Sample Diluation At Injector," the entirety of which is incorporated herein by reference.

FIELD OF THE INVENTION

The invention relates generally to liquid chromatography systems. More particularly, the invention relates to a system and method for controlling sample injection in a liquid chromatography system.

BACKGROUND

Purified compounds are required for testing and analysis protocols applied in many scientific fields. Purification of a compound involves separating a desired component or components from a mixture that contains additional components or impurities. Chromatography methods can be applied to fractionate a mixture into separate components. In liquid chromatography, a sample containing a number of components to be separated is injected into a system flow and directed through a chromatographic column. The column separates the mixture by differential retention into its separate components. The components elute from the column as distinct bands separated in time.

A typical high performance liquid chromatography (HPLC) system includes a pump for delivering a fluid (the "mobile phase") at a controlled flow rate and composition, an injector to introduce a sample solution into the flowing mobile phase, a chromatographic column that contains a packing material or sorbent (the "stationary phase"), and a detector to detect the presence and amount of the sample components in the mobile phase leaving the column. When the mobile phase passes through the stationary phase, each component of the sample typically emerges from the column at a different time because different components in the sample typically have different affinities for the packing material. The presence of a particular component in the mobile phase exiting the column can be detected by measuring changes in a physical or chemical property of the eluent. By plotting the detector signal as a function of time, response "peaks" corresponding to the presence and quantities of the components of the sample can be observed.

Preparative HPLC is a convenient way to isolate and purify a quantity of a compound for further studies or use. Depending on the specific application, preparative separations can be performed using large columns and sample sizes, or may be performed using small columns for smaller volume collection of components. A common distinction between preparative and analytical HPLC is that for preparative HPLC, the sample components are collected after purification, whereas for analytical HPLC, the sample components are simply detected and quantified.

Large sample injections into chromatographic systems interfere with chromatographic separations due to large volume of sample dilution changing the elutropic properties of the liquid present in the chromatographic column. Dilution of the large sample injections with the mobile phase reduces or eliminates these interferences. However, dilution distorts the peak shapes detected by the detector downstream from the chromatographic column.

SUMMARY

In one embodiment, a method for injecting a sample into a flow of a liquid chromatography system comprises: providing a flow of a mobile phase; and injecting a volume of a sample into the flow of the mobile phase such that the concentration of the sample within the mobile phase varies with a triangular profile over the course of the injecting.

Additionally or alternatively, the injecting the volume of the sample into the flow of the mobile phase varies throughout an entire inject sequence without ever maintaining a constant sample flow rate during the entire inject sequence.

Additionally or alternatively, the method further comprises: impacting a resultant peak shape output from a detector to increase peak magnitude or decrease peak width output by the detector by the injecting the volume of the sample with the varied concentration.

Additionally or alternatively, the volume is at least 100 µl.

Additionally or alternatively, the injecting the volume of the sample into the flow of the mobile phase includes increasing the flow of the sample and then immediately decreasing the flow of the sample to create a triangular velocity profile of the sample.

Additionally or alternatively, the injecting the volume of the sample into the flow of the mobile phase includes increasing the flow of the sample at a constant acceleration of flow rate over time and decreasing the flow of the sample at a constant deceleration of flow rate over time.

Additionally or alternatively, the injecting the volume of the sample into the flow of the mobile phase includes increasing the flow of the sample at a varying acceleration of flow rate over time and decreasing the flow of the sample at a varying deceleration of flow rate over time.

In another embodiment, a liquid chromatography system comprises: a solvent delivery system configured to provide a flow of a mobile phase; a sample delivery system configured to inject a volume of a sample into the mobile phase; a control module in communication with at least one of the solvent delivery system and the sample delivery system, the control module configured to control a volumetric flow rate of the sample dispensed by the sample delivery system, the control module being configured to control concentration of the sample within the mobile phase such that the concentration of the sample within the mobile phase varies with a triangular profile over the course of injecting of the sample into the mobile phase by the sample delivery system; a liquid chromatography column located downstream from the sample delivery system and the solvent delivery system; and a detector located downstream from the liquid chromatography column.

Additionally or alternatively, the control module is configured to inject the volume of the sample into the flow of the mobile phase in a varied manner throughout an entire inject sequence without ever maintaining a constant sample flow rate during the entire inject sequence.

Additionally or alternatively, the control module is further configured to impact a resultant peak shape output from the detector to increase peak magnitude or decrease peak width output by the detector by the injecting the volume of the sample with the varied concentration.

Additionally or alternatively, the volume is at least 100 µl.

Additionally or alternatively, the control module is configured to inject the volume of the sample into the flow of the mobile phase by increasing the flow of the sample and then immediately decreasing the flow of the sample to create a triangular velocity profile of the sample.

Additionally or alternatively, the control module is configured to inject the volume of the sample into the flow of the mobile phase by increasing the flow of the sample at a constant acceleration of flow rate over time and decreasing the flow of the sample at a constant deceleration of flow rate over time.

Additionally or alternatively, the control module is configured to inject the volume of the sample into the flow of the mobile phase by increasing the flow of the sample at a varying acceleration of flow rate over time and decreasing the flow of the sample at a varying deceleration of flow rate over time.

In another embodiment, a computer program product, comprising one or more computer readable hardware storage devices storing a computer readable program code, the computer readable program code comprising an algorithm that when executed by one or more processors of a computing system of a liquid chromatography system, implements a method for injecting a sample into a flow of the liquid chromatography system, the method comprises: providing a flow of a mobile phase; and injecting a volume of a sample into the flow of the mobile phase such that the concentration of the sample within the mobile phase varies with a triangular profile over the course of the injecting.

Additionally or alternatively, the injecting the volume of the sample into the flow of the mobile phase varies throughout an entire inject sequence without ever maintaining a constant sample flow rate during the entire inject sequence.

Additionally or alternatively, the method further comprises: impacting a resultant peak shape output from a detector to increase peak magnitude or decrease peak width output by the detector by the injecting the volume of the sample with the varied concentration.

Additionally or alternatively, the volume is at least 100 µl.

Additionally or alternatively, the injecting the volume of the sample into the flow of the mobile phase includes increasing the flow of the sample at a constant acceleration of flow rate over time and decreasing the flow of the sample at a constant deceleration of flow rate over time.

Additionally or alternatively, the injecting the volume of the sample into the flow of the mobile phase includes increasing the flow of the sample at a varying acceleration of flow rate over time and decreasing the flow of the sample at a varying deceleration of flow rate over time.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
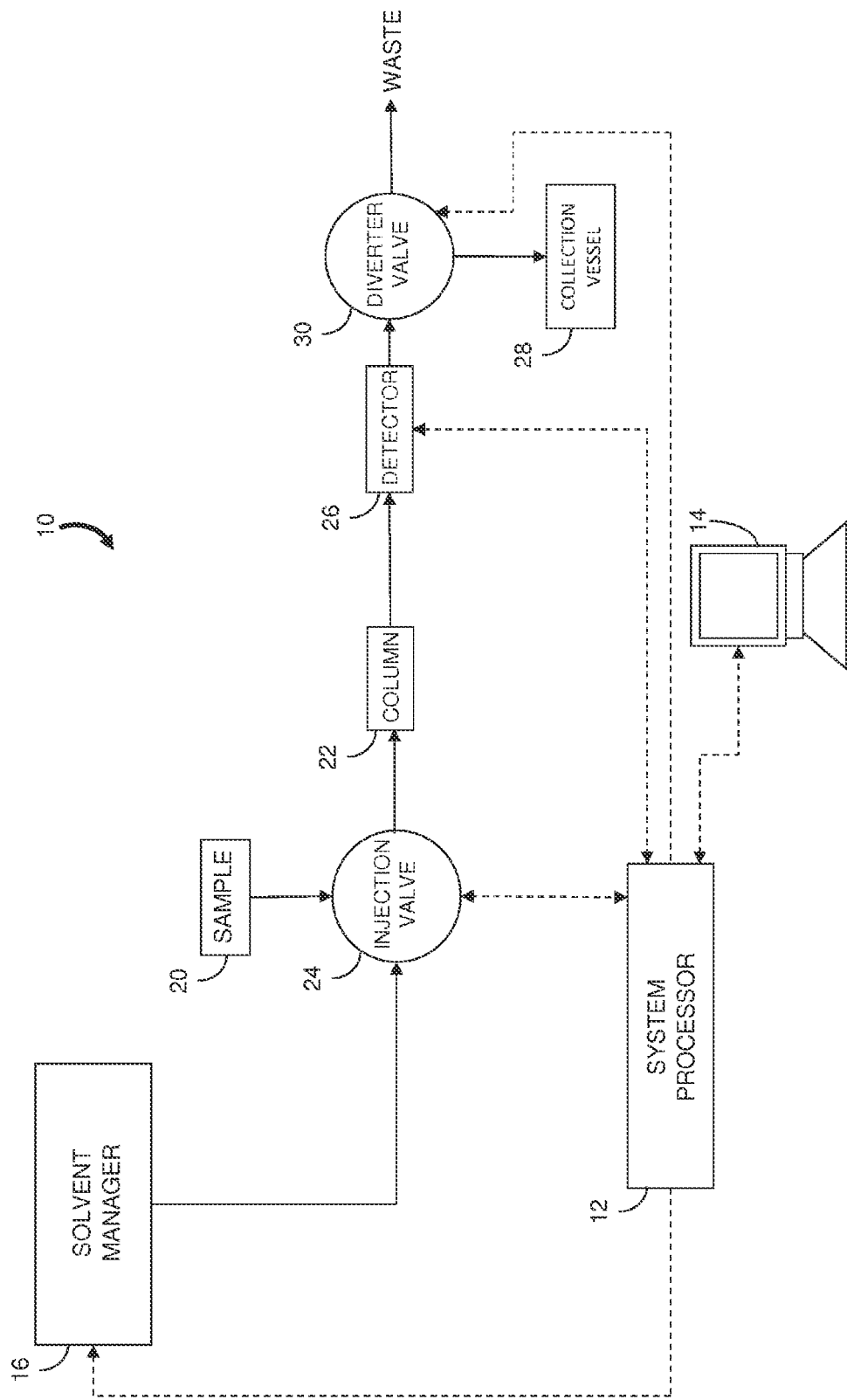
FIG. 1 is a block diagram of a liquid chromatography system that can be used to practice embodiments of the method of the invention.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The mobile phase is a solvent used to dissolve a sample and carry the sample through the stationary phase of a liquid chromatography system. As used herein, the word "sample" refers to a sample solution that contains the sample components to be injected into the system flow of the liquid chromatography system. The sample is typically made available in a sample reservoir or sample container. The sample solution may also include a sample diluent. The mobile phase may be a gradient mobile phase in which the composition of the mobile phase changes with time.

As used herein, a solvent is sometimes referred to as a "strong solvent" or a "weak solvent" to indicate the relative elution strength of the solvent with respect to one or more other solvents. If the mobile phase is a strong solvent, the sample dissolved in the strong solvent will have a greater affinity for the mobile phase than the stationary phase. A strong solvent is generally capable of dissolving a greater quantity of a sample than a weak solvent; however, with the use of a strong solvent there may be a shorter retention time and little or no retention of the sample on the stationary phase. In contrast, if the mobile phase is a weak solvent, the sample dissolved in the weak solvent will have a greater affinity for the stationary phase than the mobile phase. As a result, sample components are better retained on the stationary phase and have longer retention times. By way of non-limiting examples for reversed phase chromatography, solvents composed primarily of methanol, acetonitrile, ethanol, isopropanol or tetrahydrofuran are typically considered strong solvents whereas water is generally considered a weak solvent. By way of non-limiting examples for normal phase chromatography and supercritical fluid chromatography, hexane and heptane are generally considered weak solvents, and methanol, ethanol and water are typically considered strong solvents.

In order for the stationary phase in the chromatographic column to preferentially retain sample components, the mobile phase is initially composed of a weak solvent of sufficiently low or moderate strength to prevent the sample components from simply passing through the column with little or no retention or separation. A gradient mobile phase gradually increases in strength over time to elute the sample components at different times.

In various applications, the sample may be provided in a solution that includes a strong diluent which may interfere with retention of the sample components on the stationary phase. To enable the sample components to be retained, or "focused," at the head of the chromatographic column, it is often desirable to further dilute the sample solution using a weaker solvent although the volume of the diluted sample is thereby increased. The use of the phrase "dilution ratio" is used herein to describe the degree, or amount, of the dilution and means a unit volume contribution of the sample with respect to the number of unit volumes contributed by the one or more diluents.

Large sample injections into chromatographic systems interfere with chromatographic separations due to large volume of sample dilution changing the elutropic properties of the liquid present in the chromatographic column. Dilution of the large sample injections with the mobile phase reduces or eliminates these interferences. Incorporating the dilution function with the normal sample injection function reduces the number of components and the complexity of the system. By controlling the dilution factor or dilution ratio of the sample, detrimental effects of the dilution such as lower chromatographic separation efficiencies can be reduced or eliminated. Diluting the sample injection volume increases the width of the chromatographic peak which will decrease the peak resolution of the eluted peaks especially in compounds that elute at the initial conditions of the chromatographic separation. In accordance with embodiments described herein, the dilution of the sample may be done at a varied rate so that the injected compound concentration varies in time and flow to result in a triangular peak similar to a normal chromatographic peak.

In brief overview, the invention relates to a method and a system for injecting a sample into a flow of a liquid chromatography system. The method includes providing a flow of a mobile phase and injecting a volume of a sample into the flow of the mobile phase such that the concentration of the sample within the mobile phase varies with a triangular profile over the course of the injecting. Specifically, the present invention contemplates varying the injection volume of sample throughout an entire inject sequence without maintaining a constant sample flow rate during the entire inject sequence. Rather than bringing the sample velocity to a predetermined velocity rate and holding at this rate, the present invention contemplates instead increasing the flow of the sample and then immediately decreasing the flow of the sample to create a triangular velocity profile of the sample. Thus, methods described herein may be configured to impact a resultant peak shape output from a detector to increase peak magnitude and/or decrease peak width output by the detector by the injecting the volume of the sample with the varied concentration and velocity profiles throughout an inject sequence.

Embodiments of the system described herein allow for controlled dilution of a sample at the location of injection into a pressurized system flow in a manner that addresses the inherent trapezoidal or rectangular peak shape of peaks that do not retain well in a chromatographic column. Embodiments described herein allow the user to dynamically introduce the sample to the pressurized flowing stream using a syringe that can operate at high system pressures. The syringe may be controlled by a control system to accelerate and then immediately decelerate the injection of the sample during an inject sequence. The sample dilution is therefore done with a triangular velocity profile which generates a triangular resultant peak.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

FIG. 1 is a block diagram of a liquid chromatography system 10 that can be modified to practice embodiments of the method of the invention. The system 10 includes a system processor 12 (e.g., microprocessor and controller) in communication with a user interface device 14 for receiving input parameters and displaying system information to an operator. The system processor 12 communicates with a solvent manager 16 which provides one or more solvents for a mobile phase. For example, the solvent manager 16 may provide a gradient mobile phase. A sample from a sample source 20 is injected into the mobile phase upstream from a chromatographic column 22 at an injection valve 24. The sample source 20 can be a sample reservoir such as a vial or other container that holds a volume of the sample. In some instances, the sample source 20 provides a diluted sample that includes the sample and a diluent. The chromatographic column 22 is coupled to a detector 26 which provides a signal to the system processor 12 that is responsive to various components detected in the eluent from the column 22. After passing through the detector 26, the system flow exits to a waste port; however, when used for fraction collection, a diverter valve 30 is used to direct the system flow to one or more collection vessels 28.

Figure 2:
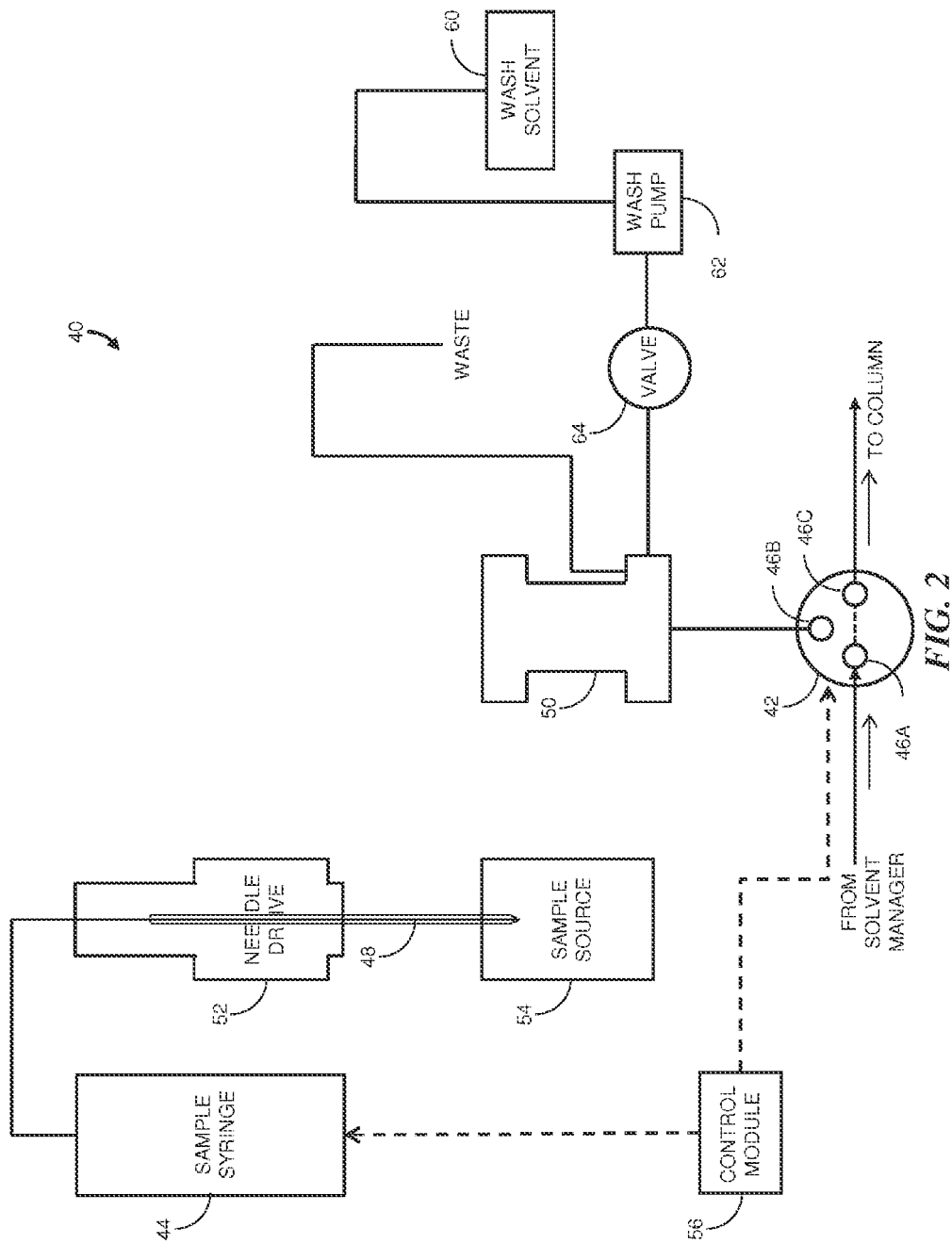
FIG. 2 is a block diagram of an embodiment of a system for injecting a sample into a flow of a liquid chromatography system when the system is configured for loading a sample.

FIG. 2 is a block diagram of an embodiment of a system 40 for injecting a sample into a flow of a liquid chromatography system according to the invention. The system 40 includes a valve 42 having three ports 46A, 46B and 46C (generally 46), a sample syringe 44, a sample needle 48, an injection port 50, a needle drive 52, a sample source 54 and a control module 56.

The sample syringe 44 is adapted for direct fluidic communication with the pressurized system flow of the liquid chromatography system. For example, the sample syringe 44 may be formed as a stainless steel barrel and plunger, and have a stroke that can be accurately controlled for both speed and acceleration, along with displacement, while operating under high system pressures (e.g., 7,000 psi).

One of the ports 46A on the valve 42 communicates with a solvent manager through tubing or another form of conduit to receive a system flow in the form of a mobile phase. A second port 46B is in communication with the injection port 50 and is configured to receive a sample to be injected into the system flow. A third port 46C is in communication with a chromatographic column through tubing or other conduit. The valve 42 is operable in at least two states in which the configurations of liquid flowing through the vale 42 are different. The valve 42 is shown in a first state in which the mobile phase from solvent manager received at port 46A passes through the valve 42 and exits at port 46C. In a second state, the flow of the mobile phase through the valve 42 remains the same; however, the sample provided at port 46B is combined with the mobile phase received at port 46A such that the combined flows exit the valve 42 at port 46C.

The injection valve 42 operates at high system pressures, for example, pressures that may exceed 25,000 psi. In some embodiments, the valve 42 is a rotary shear seal valve. Examples of other types of valves that can operate at sufficiently high pressure and be used as an injection valve include a gate valve, a butterfly valve, a needle valve or a rotary cylinder valve. Although shown as only having three ports 46, it should be recognized that a valve having more than three ports can also be used as long as the valve can be configured to provide the same flow paths and switching capability as the illustrated valve 42.

Control of the injection valve 42 is achieved with the control module 56 and includes the ability to switch the valve 42 between the two states. In various embodiments, the control module 56 may be implemented in a system processor 12 (FIG. 1). In alternative embodiments, the control module 56 is a computer (e.g., personal computer (PC)) or standalone controller that can receive commands or one or more control signals from the system processor 12 or other module.

Figure 3:
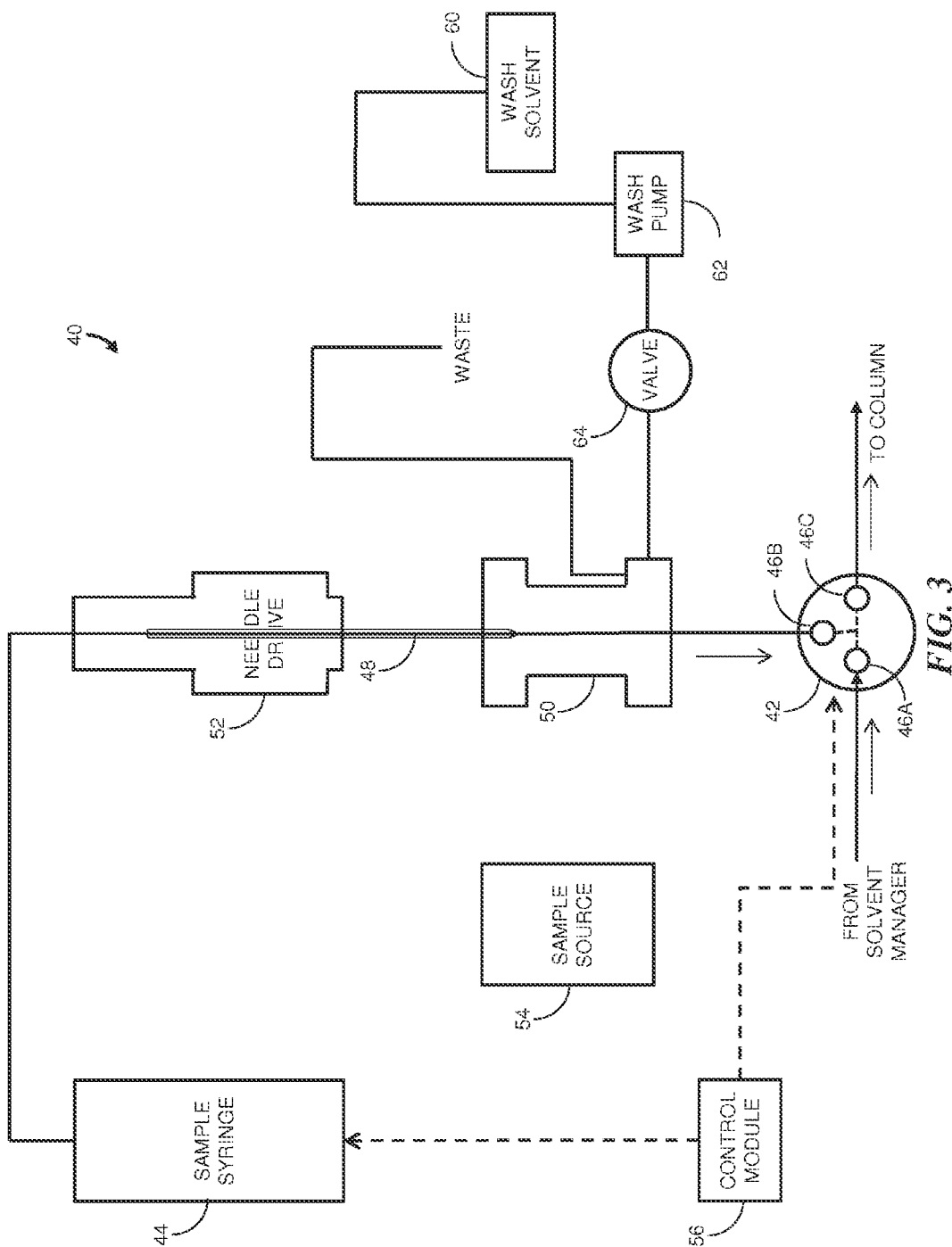
FIG. 3 is a block diagram of the system shown in FIG. 2 when the system is configured for introducing the sample into the mobile phase of the liquid chromatography system.

The needle drive 52 is used to move the sample needle 48 to various positions within the system 40. For example, the needle drive 52 is used to move the tip of the sample needle 48 into position in the sample source 54 (e.g., sample reservoir or sample vial), as illustrated, and can be used to move the sample needle 48 to a position in which the sample needle 48 engages the injection port 50 as shown in FIG. 3.

The control module 56 is also in communication with the sample syringe 44 and is used to control the loading of sample from the sample source 54 into the sample needle 48 and the dispensing of sample from the sample needle 48 into the mobile phase. Sample dilution at the location of injection according to embodiments of the methods and systems described herein generally refers to dilution of the liquid from the sample source by the mobile phase of the chromatography system. If the sample source provides an undiluted sample, the mobile phase is the only diluent. In contrast, if the sample source 54 provides the sample in a sample diluent, the mobile phase is a second diluent that is used to further dilute the raw sample. The control module 56 is used to accurately control the volumetric flow rate of the sample dispensed from the sample needle 48 into the mobile phase.

The illustrated system is shown with a source 60 of a wash solvent that is in communication with the injection port 50 through a wash pump 62 and a wash valve 64. These components are used to wash the fluid path in the injection port 50 and to purge the solvent from the sample needle 48. These operations may be used after completion of a sample injection or before initiating a subsequent sample injection in order to reduce or eliminate cross-contamination that may occur between sample injections for consecutive separations.

Figure 4:
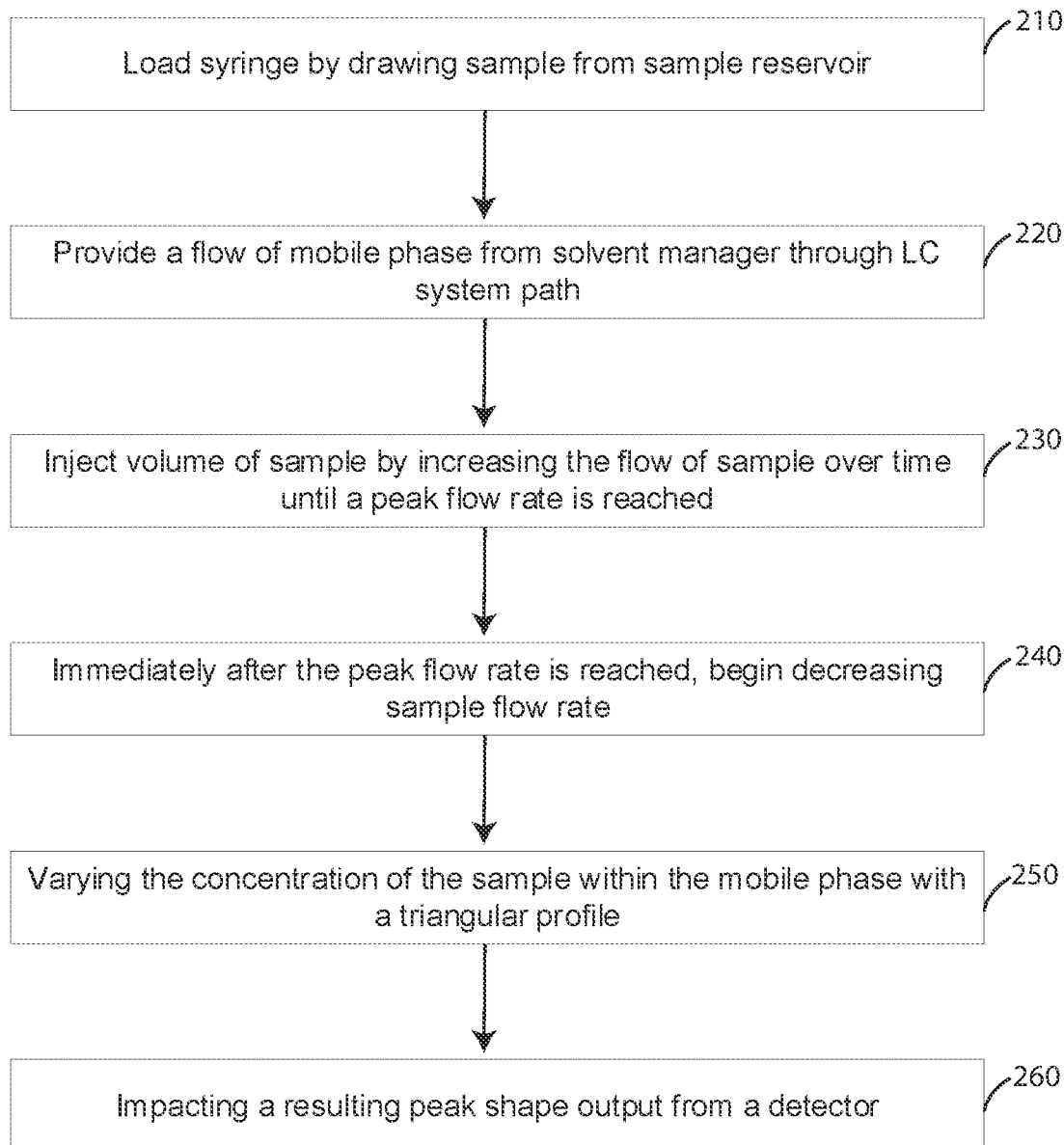
FIG. 4 is a flowchart representation of an embodiment of a method for injecting a sample into a flow of a liquid chromatography system.

Referring to FIG. 2 and also to the flowchart representation of an embodiment of a method 200 for injecting a sample into a flow of a liquid chromatography system as shown in FIG. 4, the sample syringe 44 is loaded (step 210) by acquiring sample from the sample source (e.g., sample reservoir) 54. The volume of sample acquired is determined by the intake stroke of the syringe 44, for example. A flow of mobile phase is provided (step 220) through the system path of the liquid chromatography system in advance of and during the sample injection. This mobile phase flow rate may be at a constant rate. The needle drive 52 removes the sample needle 48 from the sample source 54 and moves it into the injection port 50 as shown in FIG. 3. Subsequently, the sample syringe 44 is activated by the control module 56 to inject or otherwise dispense a flow of the sample into the mobile phase. This combination (step 230) of the two flows creates a diluted sample in the mobile phase. The volumetric flow rate of the sample dispensed from the syringe 44 is controlled by the control module 56. As shown in step 230, the control module 56 controls the volume injection by increasing the flow of the sample over time until a peak flow rate is reached. Then, at step 240, the control module controls the volume flow rate of the sample to immediately begin decreasing the sample flow rate once the peak flow rate is reached. Thus, the control module 56 may be configured to thereby vary the concentration of the sample within the mobile phase with a triangular profile, as shown in step 250. A final step 260 shows that the control module 56 impacts a resulting peak shape output from the detector 26.

The control module 56 may be configured to receive various data from, for example, input from a user input device. For example, the control module 56 can be configured to receive data indicating the desired peak flow velocity or volume flow rate of the sample from the syringe 44. The control module 56 may further be configured to receive a desired sample flow rate of acceleration for a first phase of an inject cycle. The control module 56 may still further be configured to receive a length of time the control module 56 may increase the flow rate at the desired acceleration. The control module 56 may further be configured to receive a desired sample flow rate of deceleration once a peak flow rate is reached. Still further, the control module 56 may be configured to receive a rate of acceleration change over time or a rate of deceleration change over time. These various data inputs may be received by the control module 56 for processing and may be used to control, by the control module 56, the rate of sample injection by the syringe 44.

Figure 5A:
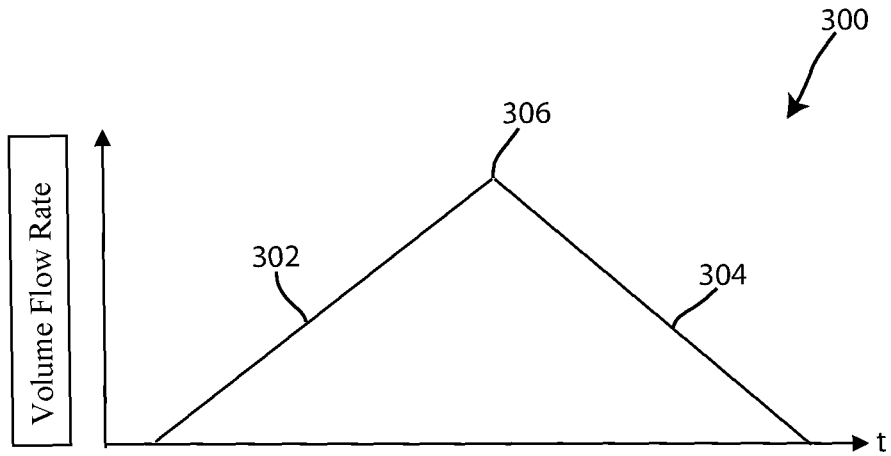
FIG. 5A is a graph charting the volume flow rate over time of a volume of sample being injected into a mobile phase in accordance with one embodiment.

FIG. 5A is a graph 300 charting the volume flow rate over time of a volume of sample being injected into a mobile phase in accordance with one embodiment. The graph 300 plots a volume flow rate over time (t). As shown, the volume flow rate of the sample is configured to increase over time with a constant rate of increase (acceleration) during a first phase 302 of an inject sequence until a peak 306 is reached. Immediately following the reaching of the peak 306, the volume flow rate of the sample is configured to decrease over time with a constant rate (deceleration) during a second phase 304 of the inject sequence. This sample injection sequence may be input by a user into the control module 56, which may be configured to implement the shown inject sequence by controlling the syringe 44.

Figure 5B:
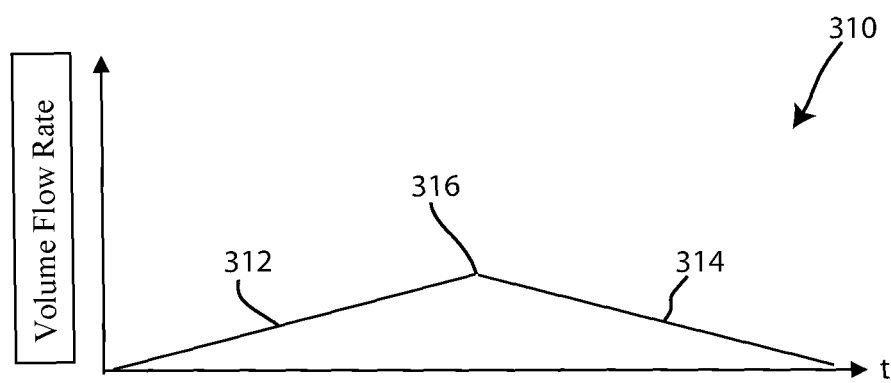
FIG. 5B is a graph charting the volume flow rate over time of a volume of sample being injected into a mobile phase in accordance with one embodiment.

FIG. 5B is a graph 310 charting the volume flow rate over time of a volume of sample being injected into a mobile phase in accordance with one embodiment. The graph 310 plots a volume flow rate over time (t). As shown, the volume flow rate of the sample is configured to increase over time with a constant rate of increase (acceleration) during a first phase 312 of an inject sequence until a peak 316 is reached. This first phase 312 has a lower acceleration than the first phase 302 of the graph 300. Immediately following the reaching of the peak 316, the volume flow rate of the sample is configured to decrease over time with a constant rate (deceleration) during a second phase 314 of the inject sequence. This second phase 314 has a lower rate of deceleration than the second phase 304 of the graph 300. This sample injection sequence may be input by a user into the control module 56, which may be configured to implement the shown inject sequence by controlling the syringe 44.

Figure 5C:
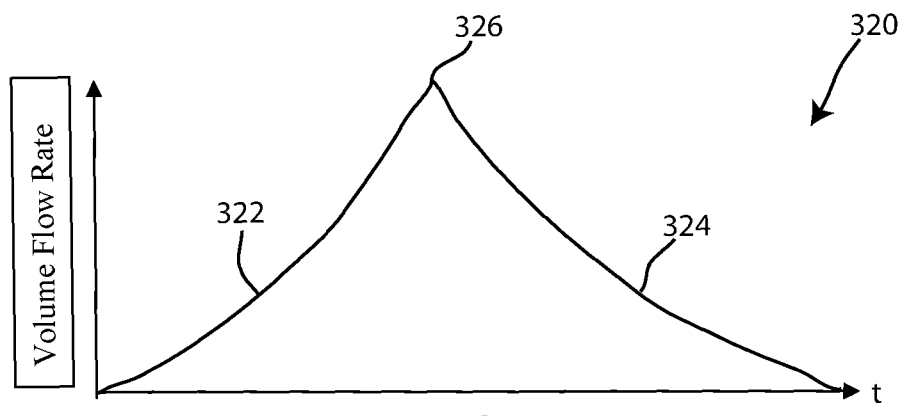
FIG. 5C is a graph charting the volume flow rate over time of a volume of sample being injected into a mobile phase in accordance with one embodiment.

FIG. 5C is a graph 320 charting the volume flow rate over time of a volume of sample being injected into a mobile phase in accordance with one embodiment. The graph 310 plots a volume flow rate over time (t). As shown, the volume flow rate of the sample is configured to increase over time with a constant rate of increase (acceleration) during a first phase 312 of an inject sequence until a peak 316 is reached. This first phase 312 has a lower acceleration than the first phase 302 of the graph 300. Immediately following the reaching of the peak 316, the volume flow rate of the sample is configured to decrease over time with a constant rate (deceleration) during a second phase 314 of the inject sequence. This second phase 314 has a lower rate of deceleration than the second phase 304 of the graph 300. This sample injection sequence may be input by a user into the control module 56, which may be configured to implement the shown inject sequence by controlling the syringe 44.

The above examples shown in FIGS. 5A, 5B, 5C show three exemplary inject sequences for injecting a sample at a triangular velocity profile, although various other triangular profiles are contemplated having steeper or more gradual rates of acceleration or deceleration, or varying accelerations and decelerations during the first and second phases of an inject cycle. Further, a "triangular profile" herein means a profile that is substantially triangular and having a clearly defined volume flow rate increase over time which reaches an apex at a peak 306, 316, 326 and switches to a clearly defined volume flow rate decrease during the course of a sample injection sequence. As an example, as shown in FIG. 5C the clearly defined volume flow rate increase and decrease legs of the triangle may not be a perfectly straight line and may have one or more flow rate changes in acceleration and/or deceleration of the volume flow. These changes to the acceleration of flow do not change the shape of the profile as being substantially a "triangular profile." In other embodiments, the volume flow rate increases may be perfectly straight with a constant acceleration of flow.

Figure 6A:
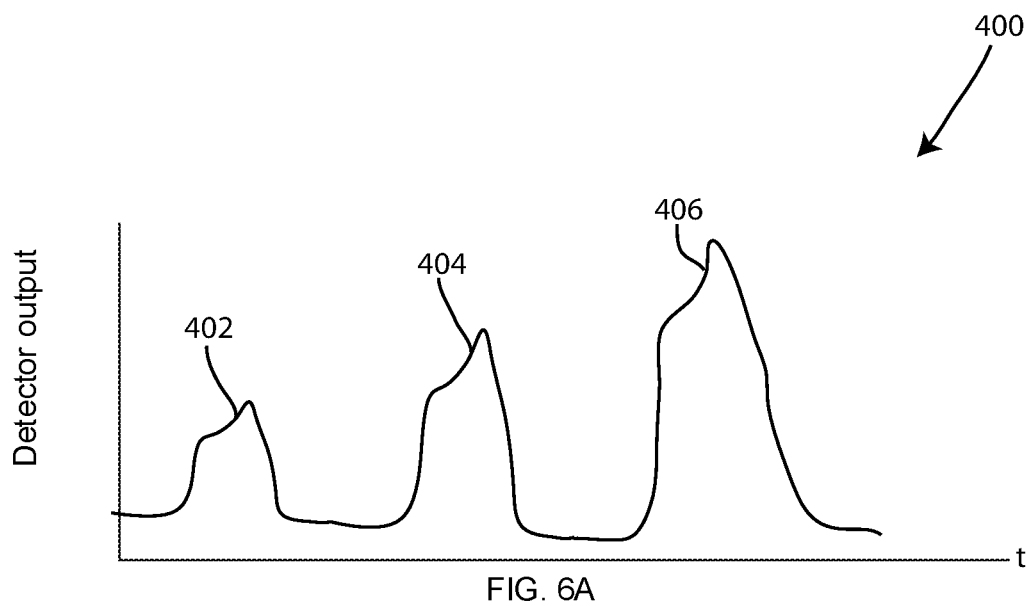
FIG. 6A depicts a prior art detector output in accordance with one embodiment.
Figure 6B:
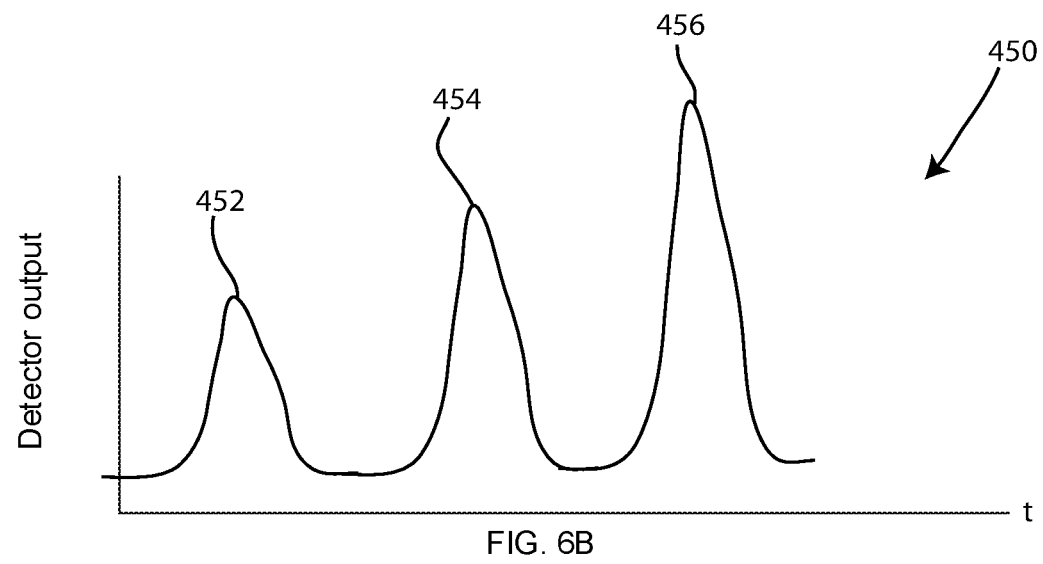
FIG. 6B depicts an exemplary detector output in accordance with the present invention.

FIG. 6A depicts a prior art detector output 400 in accordance with one embodiment. As shown, the detector output 400 is plotted over time, and includes three peaks 402, 404, and 406 which are trapezoidal in shape, and not sufficiently triangular. These are the types of peaks 402, 404, 406 which can be seen in diluted large sample injections where the sample injection is brought to a constant velocity during the majority of the inject sequence. The present invention seeks to prevent the trapezoidal peak 402, 404, 406 through the triangular velocity profile of sample introduction described herein. Such a triangular velocity profile is shown in FIG. 6B, which depicts an exemplary detector output 450 in accordance with the present invention. As shown, the same sample may elute sufficiently triangular peaks 452, 454, 456 having desired peak shapes, when the principles of the present invention are employed.

As will be appreciated by one skilled in the art, aspects of the present invention may be embodied not only as a system or a method, as described above, but also as a computer program product. Accordingly, aspects of the present invention may also take the form of an embodiment combining software and hardware aspects that may all generally be referred to as a system, and as an entirely software embodiment (including firmware, resident software, micro-code, etc.). Furthermore, aspects of the present invention may take the form of a computer program product embodied in one or more computer readable mediums having computer readable program code embodied thereon.

Any combination of one or more computer readable mediums may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific but non-exhaustive examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. More generally, as used herein a computer readable storage medium may be any tangible medium that can contain, or store a program for use by or in connection with an instruction execution system, apparatus or device.

Computer program code for carrying out operations for aspects of the present invention, for example, aspects of the method embodiments described above, may be written in any combination of one or more programming languages. The program code may execute entirely on the user's computing system, partly on the user's computing system, as a stand-alone software package, partly on the user's computing system and partly on a remote computing system or entirely on the remote computing system or server. In the latter scenario, the remote computing system may be connected to the user's computing system through any type of network, including a local area network (LAN) or a wide area network (WAN), or the connection may be made to an external computer (for example, through the Internet using an Internet Service Provider).

While the invention has been shown and described with reference to specific embodiments, it should be understood by those skilled in the art that various changes in form and detail may be made therein without departing from the spirit and scope of the invention as recited in the accompanying claims.

What is claimed is:

1. A method for injecting a sample into a flow of a liquid chromatography system comprising:
   providing a flow of a mobile phase; and
   injecting a volume of a sample into the flow of the mobile phase such that the concentration of the sample within the mobile phase varies with a triangular profile over the course of the injecting, wherein the injecting the volume of the sample into the flow of the mobile phase includes increasing the flow of the sample until a peak is reached, and then immediately decreasing the flow of the sample to create a triangular velocity profile of the sample.

2. The method for injecting the sample into the flow of the liquid chromatography system of claim 1, wherein the injecting the volume of the sample into the flow of the mobile phase varies throughout an entire inject sequence without ever maintaining a constant sample flow rate during the entire inject sequence.

3. The method for injecting the sample into the flow of the liquid chromatography system of claim 1, further comprising:
   impacting a resultant peak shape output from a detector to increase peak magnitude or decrease peak width output by the detector by the injecting the volume of the sample with the varied concentration.

4. The method for injecting the sample into the flow of the liquid chromatography system of claim 1, wherein the volume is at least 100 µl.

5. The method for injecting the sample into the flow of the liquid chromatography system of claim 1, wherein the injecting the volume of the sample into the flow of the mobile phase includes increasing the flow of the sample at a constant acceleration of flow rate over time and decreasing the flow of the sample at a constant deceleration of flow rate over time.

6. The method for injecting the sample into the flow of the liquid chromatography system of claim 1, wherein the injecting the volume of the sample into the flow of the mobile phase includes increasing the flow of the sample at a varying acceleration of flow rate over time and decreasing the flow of the sample at a varying deceleration of flow rate over time.

7. The method for injecting the sample into the flow of the liquid chromatography system of claim 1, wherein the triangular velocity profile created over the course of the injecting constitutes an entire inject sequence.

8. A liquid chromatography system comprising:
a solvent delivery system configured to provide a flow of a mobile phase;
a sample delivery system configured to inject a volume of a sample into the mobile phase;
a control module in communication with at least one of the solvent delivery system and the sample delivery system, the control module configured to control a volumetric flow rate of the sample dispensed by the sample delivery system, the control module being configured to control concentration of the sample within the mobile phase such that the concentration of the sample within the mobile phase varies with a triangular profile over the course of injecting of the sample into the mobile phase by the sample delivery system, wherein the control module is configured to inject the volume of the sample into the flow of the mobile phase by increasing the flow of the sample until a peak is reached, and then immediately decreasing the flow of the sample to create a triangular velocity profile of the sample;
a liquid chromatography column located downstream from the sample delivery system and the solvent delivery system; and
a detector located downstream from the liquid chromatography column.

9. The liquid chromatography system of claim 8, wherein the control module is configured to inject the volume of the sample into the flow of the mobile phase in a varied manner throughout an entire inject sequence without ever maintaining a constant sample flow rate during the entire inject sequence.

10. The liquid chromatography system of claim 8, wherein the control module is further configured to impact a resultant peak shape output from the detector to increase peak magnitude or decrease peak width output by the detector by the injecting the volume of the sample with the varied concentration.

11. The liquid chromatography system of claim 8, wherein the volume is at least 100 µl.

12. The liquid chromatography system of claim 8, wherein the control module is configured to inject the volume of the sample into the flow of the mobile phase by increasing the flow of the sample at a constant acceleration of flow rate over time and decreasing the flow of the sample at a constant deceleration of flow rate over time.

13. The liquid chromatography system of claim 8, wherein the control module is configured to inject the volume of the sample into the flow of the mobile phase by increasing the flow of the sample at a varying acceleration of flow rate over time and decreasing the flow of the sample at a varying deceleration of flow rate over time.

14. The liquid chromatography system of claim 8, wherein the triangular velocity profile created over the course of the injecting constitutes an entire inject sequence.

15. A computer program product, comprising one or more computer readable hardware storage devices storing a computer readable program code, the computer readable program code comprising an algorithm that when executed by one or more processors of a computing system of a liquid chromatography system, implements a method for injecting a sample into a flow of the liquid chromatography system, the method comprising:
providing a flow of a mobile phase; and
injecting a volume of a sample into the flow of the mobile phase such that the concentration of the sample within the mobile phase varies with a triangular velocity profile over the course of the injecting, wherein the injecting the volume of the sample into the flow of the mobile phase includes increasing the flow of the sample until a peak is reached, and then immediately decreasing the flow of the sample to create the triangular velocity profile of the sample.

16. The computer program product of claim 15, wherein the injecting the volume of the sample into the flow of the mobile phase varies throughout an entire inject sequence without ever maintaining a constant sample flow rate during the entire inject sequence.

17. The computer program product of claim 15, the method further comprising:
impacting a resultant peak shape output from a detector to increase peak magnitude or decrease peak width output by the detector by the injecting the volume of the sample with the varied concentration.

18. The computer program product of claim 15, wherein the volume is at least 100 µl.

19. The computer program product of claim 15, wherein the injecting the volume of the sample into the flow of the mobile phase includes increasing the flow of the sample at a varying acceleration of flow rate over time and decreasing the flow of the sample at a varying deceleration of flow rate over time.

20. The computer program product of claim 15, wherein the injecting the volume of the sample into the flow of the mobile phase includes increasing the flow of the sample at a constant acceleration of flow rate over time and decreasing the flow of the sample at a constant deceleration of flow rate over time.

* * * * *